US008467927B2

(12) United States Patent
Thompson et al.

(10) Patent No.: US 8,467,927 B2
(45) Date of Patent: *Jun. 18, 2013

(54) METHOD AND SYSTEM FOR SPEED CONTROL OF A HYBRID VEHICLE

(75) Inventors: Scott James Thompson, Waterford, MI (US); Kenneth Frederick, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/288,682

(22) Filed: Nov. 3, 2011

(65) Prior Publication Data
US 2013/0116867 A1   May 9, 2013

(51) Int. Cl.
*B60L 11/00*   (2006.01)
(52) U.S. Cl.
USPC .................................................. 701/22
(58) Field of Classification Search
USPC .................................................. 701/22
See application file for complete search history.

(56) References Cited

U.S. PATENT DOCUMENTS

| | | | |
|---|---|---|---|
| 4,009,695 A | 3/1977 | Ule | |
| 5,467,748 A * | 11/1995 | Stockhausen | 123/198 F |
| 6,051,951 A * | 4/2000 | Arai et al. | 318/700 |
| 6,459,980 B1 | 10/2002 | Tabata et al. | |
| 7,040,433 B2 * | 5/2006 | Yamamoto et al. | 180/65.225 |
| 7,213,666 B2 * | 5/2007 | Saito et al. | 180/65.225 |
| 7,246,673 B2 * | 7/2007 | Vahabzadeh et al. | 180/65.28 |
| 7,527,028 B2 * | 5/2009 | Leone | 123/90.15 |
| 7,747,375 B2 * | 6/2010 | Mann et al. | 701/101 |
| 7,878,282 B2 * | 2/2011 | Kumazaki et al. | 180/65.265 |
| 8,069,829 B2 * | 12/2011 | Leone | 123/90.17 |
| 8,287,411 B2 * | 10/2012 | Lee et al. | 180/65.21 |
| 2006/0289214 A1 | 12/2006 | Katsuhiro et al. | |
| 2007/0266711 A1 * | 11/2007 | Falkenstein et al. | 60/702 |
| 2008/0185194 A1 * | 8/2008 | Leone | 180/65.2 |
| 2009/0150015 A1 | 6/2009 | Okubo et al. | |
| 2009/0294191 A1 | 12/2009 | Sheidler et al. | |
| 2010/0280737 A1 | 11/2010 | Ewert et al. | |
| 2010/0288570 A1 * | 11/2010 | Tarnowsky et al. | 180/65.265 |

FOREIGN PATENT DOCUMENTS

EP   1354389 B1   6/2010

OTHER PUBLICATIONS

Perkins, William Paul et al., "Method and System for Valve Operation Control," U.S. Appl. No. 13/288,657, filed Nov. 3, 2011, 52 pages.

* cited by examiner

*Primary Examiner* — Mary Cheung
*Assistant Examiner* — Michael Berns
(74) *Attorney, Agent, or Firm* — Julia Voutyras; Alleman Hall McCoy Russell & Tuttle LLP

(57) ABSTRACT

Methods and systems are provided for raising the speed of a hybrid electric vehicle operating in an electric-only mode. During conditions when the vehicle is driven only by an electric motor, vehicle speed may be raised by spinning the engine unfueled using power from a system battery, while adjusting valve operation to reduce engine pumping losses. In this way, vehicle speed may be raised more efficiently and without damaging rotating transmission components.

20 Claims, 7 Drawing Sheets

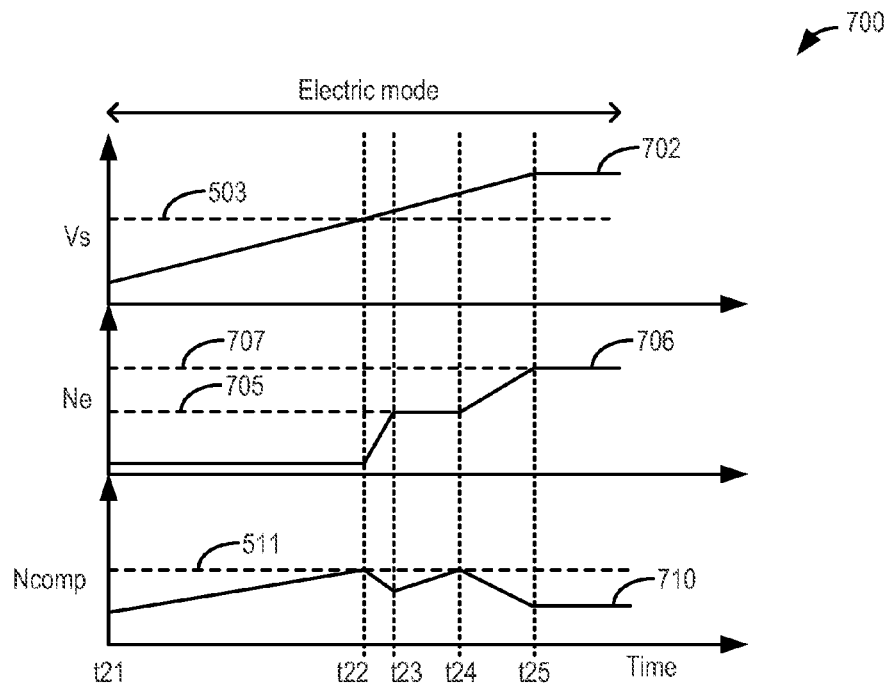

FIG. 7

| Vehicle mode | Engine status | Propulsion power |
|---|---|---|
| Engine mode | Engine spinning fueled | From engine via planetary gearset |
| Assist mode | Engine spinning fueled | From engine via planetary gearset + battery via motor |
| Electric_1 mode | Engine not spinning | From battery via motor |
| Electric_2 mode | Engine spinning unfueled | From battery via motor + (optionally) from generator via planetary gearset |

FIG. 8

METHOD AND SYSTEM FOR SPEED CONTROL OF A HYBRID VEHICLE

FIELD

The present application relates to reducing pumping losses while controlling the vehicle speed of a hybrid electric vehicle, in particular when operating in an electric-only mode.

BACKGROUND AND SUMMARY

Hybrid vehicle systems may be configured with various transmission components. For example, in power-split transaxle hybrid vehicle systems, the transmission may include a planetary gear system directly coupled to the engine, and further coupled to the wheels via one or more rotating components, such as gears, pinions, and bearings. During vehicle operation, transmission control takes into consideration the speed constraints of the various rotating transmission components to avoid damage to the components.

The inventors herein have recognized a potential issue with such systems. The mechanically-imposed speed constraints of the transmission components may limit the maximum attainable vehicle speed, in particular during engine-off modes of operation. Specifically, when the vehicle is operated in an electric mode with the engine off, and the vehicle is being propelled by energy from a system battery, the maximum allowable vehicle speed is limited to a speed that protects the rotating transmission components from speed-incurred damage. As such, this may degrade the operator's drive experience. To provide higher vehicle speeds, the engine may be fueled and spun. However, this reduces operation of the hybrid vehicle system in the electric mode and degrades fuel economy.

In one example, some of the above issues may be at least partly addressed by a method of operating a hybrid electric vehicle system including a rotating transmission component. In one embodiment, the method comprises, during an electric-only mode of operation, below a threshold vehicle speed, raising vehicle speed without spinning an engine while increasing a rotational speed of the transmission component. The method further comprises, above the threshold vehicle speed, raising vehicle speed without increasing the rotational speed of the transmission component by spinning the engine unfueled. In this way, the maximum vehicle speed attainable when operating in the electric-only mode may be raised.

For example, a hybrid electric vehicle may be configured with a planetary gear transmission. During selected conditions when the vehicle is driven only by an electric motor, a controller may allow the vehicle speed to be increased up to a threshold vehicle speed without spinning the engine. As such, up to the threshold speed, as the vehicle speed increases, the rotational speed of a rotating transmission component (such as a gear component) may also increase. Above the threshold vehicle speed, further rotation of the transmission component may lead to mechanical degradation of the component. Therefore, above the threshold vehicle speed, the controller may allow the vehicle speed to be further increased by spinning the engine unfueled. Based on the configuration of the transmission component with relation to the engine and the wheels, as the engine speed is increased, the rotational speed of the transmission component may be decreased (or maintained at the upper limit), allowing the maximum vehicle speed attainable in the electric-only mode to be raised.

In this way, higher vehicle speeds may be attained while continuing to operate a hybrid vehicle in a fuel-efficient electric mode with power provided from a system battery. By spinning the engine unfueled above a threshold speed, the rotational speed of a rotating transmission component may be maintained at, or lowered below, a speed above which the component may incur mechanical damage. By prolonging the electric mode of vehicle operation without limiting vehicle speed, the operator's drive experience can be improved while providing higher fuel economy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 5-7 illustrate example scenarios of spinning an engine unfueled to raise a vehicle speed while maintaining the rotational speed of a transmission component at or below a limit.

FIG. 8 depicts a table illustrating the engine status and the source of vehicle propulsion power during various vehicle operating modes.

DETAILED DESCRIPTION

Figure 1:
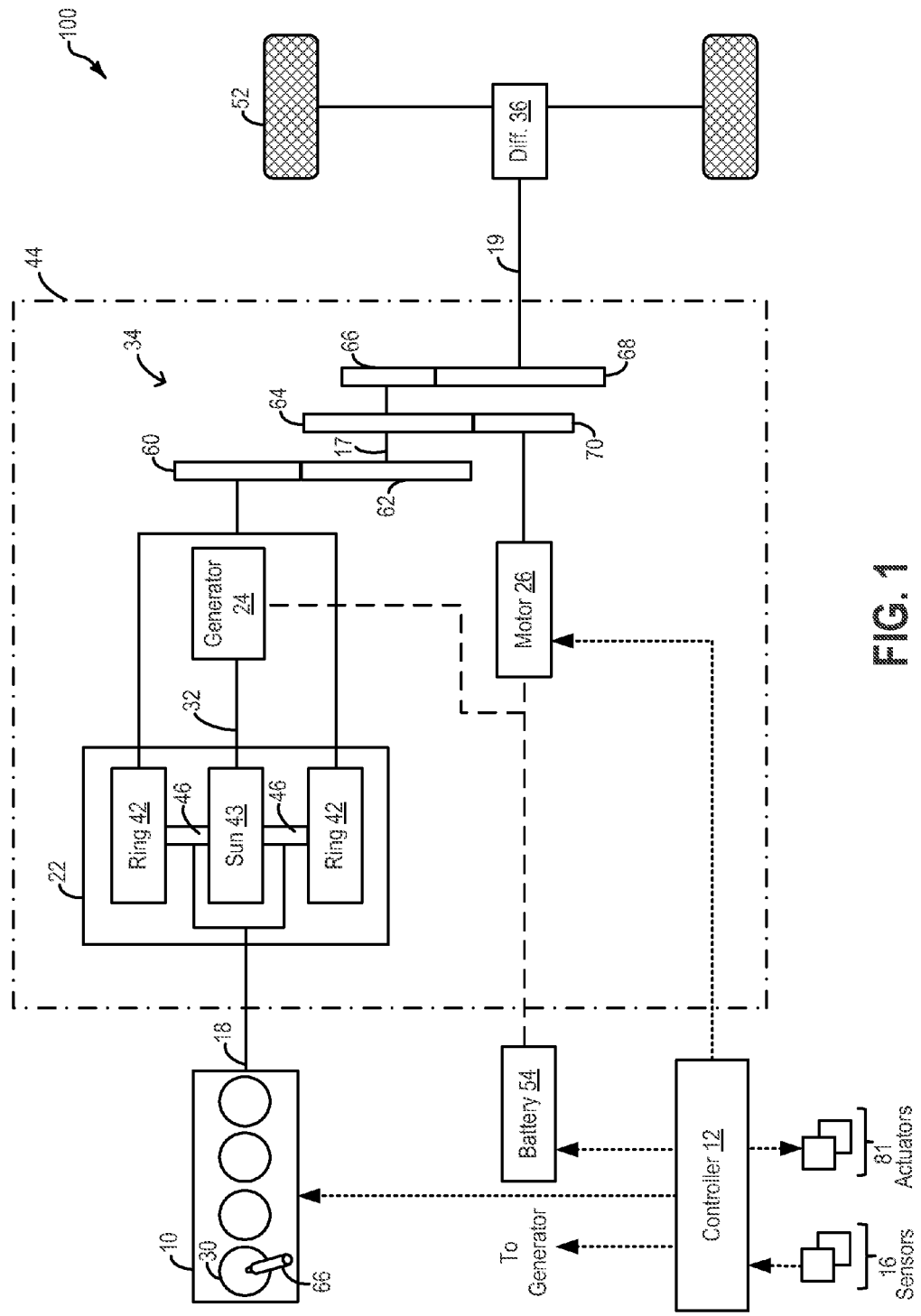
FIG. 1 illustrates an example propulsion system for a hybrid electric vehicle.
Figure 2:
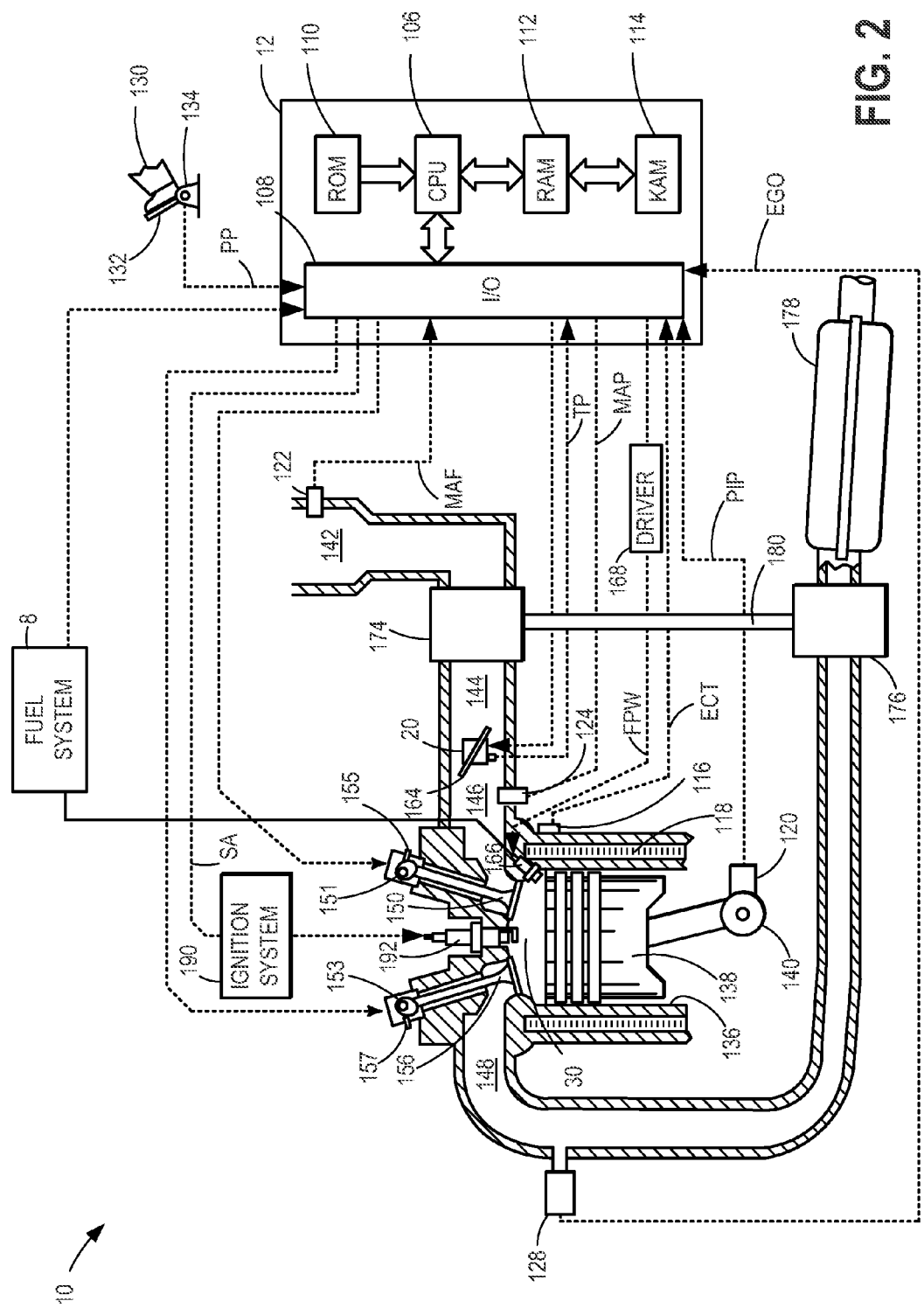
FIG. 2 illustrates an example internal combustion engine.

The following description relates to systems and methods for operating a hybrid vehicle, such as the hybrid electric vehicle (HEV) of FIGS. 1-2. During conditions when the vehicle is only propelled using power from an electric motor (FIG. 8), vehicle speed may be increased by selectively spinning the engine without injecting fuel therein. An engine controller may be configured to perform a control routine, such as the routine of FIG. 3, to raise vehicle speed above a threshold speed by spinning the engine unfueled using a system battery, via a generator. By spinning the engine unfueled, the rotational speed of a rotating transmission component may be maintained within limits, thereby reducing the likelihood of component degradation. Example operations wherein a vehicle speed is raised by spinning an engine unfueled are shown with reference to FIGS. 5-7. The engine controller may be further configured to perform a control routine, such as the routine of FIG. 4, to adjust a cylinder valve operation while the engine is spinning unfueled to reduce pumping losses through the engine. Example cylinder valve timing adjustments are shown with reference to FIG. 9.

FIG. 1 depicts a hybrid propulsion system 100 for a vehicle. In the depicted embodiment, the vehicle is a hybrid electric vehicle (HEV). Propulsion system 100 includes an internal combustion engine 10 having a plurality of cylinders 30. Fuel may be provided to each cylinder of engine 10 from a fuel system (not shown) including one or more fuel tanks, one or more fuel pumps, and injectors 66.

Engine 10 delivers power to transmission 44 via torque input shaft 18. In the depicted example, transmission 44 is a power-split transmission (or transaxle) that includes a planetary gearset 22 and one or more rotating gear elements. Transmission 44 further includes an electric generator 24 and an electric motor 26. The electric generator 24 and the electric motor 26 may also be referred to as electric machines as each may operate as either a motor or a generator. Torque is output from transmission 44, for propelling vehicle tractions wheels 52, via a power transfer gearing 34, a torque output shaft 19, and differential-and-axle assembly 36.

Generator 24 is drivably connected to electric motor 26 such that each of electric generator 24 and electric motor 26 may be operated using electric energy from an electrical energy storage device, herein depicted as battery 54. In some embodiments, an energy conversion device, such as an inverter, may be coupled between the battery and the motor to convert the DC output of the battery into an AC output for use by motor. However, in alternate embodiments, the inverter may be configured in the electric motor. Due to the mechanical properties of the planetary gearset, generator 24 may be driven by a power output element (on an output side) of the planetary gearset 22 via mechanical connection 32, as further elaborated below.

Electric motor 26 may be operated in a regenerative mode, that is, as a generator, to absorb energy from vehicle motion and/or the engine and convert the absorbed kinetic energy to an energy form suitable for storage in battery 54. Furthermore, electric motor 26 may be operated as a motor or generator, as required, to augment or absorb torque provided by the engine, such as during a transition of engine 10 between different combustion modes (e.g., during transitions between a spark ignition mode and a compression ignition mode).

Planetary gearset 22 comprises a ring gear 42, a sun gear 43, and a planetary carrier assembly 46. The ring gear and sun gear may be coupled to each other via the carrier. A first input side of planetary gearset 22 is coupled to engine 10 while a second input side of the planetary gearset 22 is coupled to the generator 24. An output side of the planetary gearset is coupled to vehicle traction wheels 52 via power transfer gearing 34 including one or more meshing gear elements 60-68. In one example, the meshing gear elements 60-68 may be step ratio gears wherein carrier assembly 46 may distribute torque to the step ratio gears. Gear elements 62, 64, and 66 are mounted on a countershaft 17 with gear element 64 engaging an electric motor-driven gear element 70. Electric motor 26 drives gear element 70, which acts as a torque input for the countershaft gearing. In this way, the planetary carrier 46 (and consequently the engine and generator) may be coupled to the vehicle wheels and the motor via one or more gear elements. Hybrid propulsion system 100 may be operated in various embodiments including a full hybrid system, wherein the vehicle is driven by only the engine and generator cooperatively, or only the electric motor, or a combination. Alternatively, assist or mild hybrid embodiments may also be employed, wherein the engine is the primary source of torque and the electric motor selectively adds torque during specific conditions, such as during a tip-in event. Accordingly, hybrid propulsion system 100 may be operated in various modes of operation, as depicted in table 800 of FIG. 8.

For example, with reference to FIG. 8, the vehicle may be driven in a first engine-on mode, herein also referred to as an "engine" mode, wherein engine 10 is operated in conjunction with the electric generator (which provides reaction torque to the planetary gear-set and allows a net planetary output torque for propulsion) and used as the primary source of torque for powering wheels 52 (the generator may also be providing torque to wheels if in motoring mode). During the "engine" mode, fuel may be supplied to engine 10 from a fuel tank via fuel injector 66 so that the engine can spin fueled to provide the torque for propelling the vehicle. Specifically, engine power is delivered to the ring gear of the planetary gearset. Coincidentally, the generator provides torque to the sun gear 43, producing a reaction torque to the engine. Consequently, torque is output by the planetary carrier to gears 62, 64, 66 on countershaft 17, which in turn delivers the power to wheels 52. Optionally, the engine can be operated to output more torque than is needed for propulsion, in which case the additional power is absorbed by the generator (in generating mode) to charge the battery 54 or supply electrical power for other vehicle loads.

In another example, the vehicle may be driven in a second engine-on mode, herein also referred to as an "assist" mode. During the assist mode, engine 10 is operated and used as the primary source of torque for powering wheels 52 and the electric motor is used as an additional torque source to act in cooperation with, and supplement the torque provided by, engine 10. During the "assist" mode, as in the engine-only mode, fuel is supplied to engine 10 so as to spin the engine fueled and provide torque to the vehicle wheels.

In still another example, the vehicle may be driven in an engine-off mode, herein also referred to as an electric-only mode, wherein battery-powered electric motor 26 is operated and used as the only source of torque for driving wheels 52. As such, during the engine-off mode, no fuel may be injected into engine 10 irrespective of whether the engine is spinning or not. The "engine-off" mode may be employed, for example, during braking, low speeds, while stopped at traffic lights, etc. Specifically, motor power is delivered to gear element 70, which in turn drives the gear elements on countershaft 17, and thereon drives wheels 52.

Due to the mechanical properties of the planetary gearset and the specific coupling of different rotating transmission components to the vehicle wheels, the engine, and the battery (via the motor and/or generator), during the electric-only mode, as more power is output to increase the vehicle speed, the rotational speed of a rotating transmission component (such as one of the one or more gear elements of the transmission) also increases. For example, in the powersplit system shown, when the ring gear is not spinning (engine not spinning), the sun gear 43, shaft 32, and generator 24 must spin in order to allow the planet carrier assembly to spin (which must spin because the wheels are spinning). The planetary gear-set ratio may require the sun gear to spin proportionally faster than the carrier assembly while engine is stopped. Additionally, the planet gears in the carrier assembly may also spin at speeds proportionally higher than the carrier itself. Above a threshold vehicle speed, further rotation of the transmission component may lead to mechanical degradation of the component. As a result, during the electric-only mode, when the engine is not spinning, the maximum attainable vehicle speed may be limited by the mechanical and rotational constraints of the rotating transmission component. However, due to the specific configuration of the rotating transmission component with relation to the engine and the wheels, if the engine is spun during the electric-only mode, without the addition of fuel to the spinning engine, the rotational speed of the transmission component may be decreased (or maintained at its upper limit) as the speed of engine spinning is increased. Consequently, the maximum vehicle speed attainable in the electric-only mode (with the engine spinning unfueled) may be raised (relative to the maximum vehicle speed attainable in the electric-only mode with the engine not spinning).

Thus, during the engine-off mode, based on the vehicle speed and the driver demanded torque, the vehicle may be operated in a first electric-only mode (Electric_1 mode) wherein the vehicle is propelled by the battery 54 via the electric motor with the engine not spinning (and not fueled), or in a second electric-only mode (Electric_2 mode) wherein the vehicle is propelled by the battery 54 via the electric motor with the engine spinning unfueled. During the second electric-only mode, the generator applies torque to the planetary gear-set 22 through sun gear 43. The planet carrier provides reaction torque to this generator torque, and consequently directs torque to the engine to spin the engine. In the proposed embodiment, the reaction torque provided by the carrier is supplied by the motor 26 (or alternatively vehicle momentum during deceleration events), and consequently reduces torque from to the motor to the wheels. For this reason, motor torque can be increased during such events so that no disruption in wheel torque is observed by the driver. The cooperative supply of torque to the engine by both the motor 26 and generator 24 is what spins the engine and prevents transaxle components from over-speeding.

Returning to FIG. 1, propulsion system 100 may further include a control system including controller 12 configured to receive information from a plurality of sensors 16 (various examples of which are described herein) and sending control signals to a plurality of actuators 81 (various examples of which are described herein). As one example, sensors 16 may include various pressure and temperature sensors, a fuel level sensor, various exhaust gas sensors, etc. The various actuators may include, for example, the gear set, cylinder fuel injectors (not shown), an air intake throttle coupled to the engine intake manifold (not shown), etc. Controller 12 may receive input data from the various sensors, process the input data, and trigger the actuators in response to the processed input data based on instruction or code programmed therein corresponding to one or more routines. Example control routines are described herein with regard to FIGS. 3-4.

FIG. 2 depicts an example embodiment of a combustion chamber or cylinder of engine 10 (of FIG. 1). Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10. Specifically, the generator 24 and driveline including motor 26 are coupled to the crankshaft and provide torque for engine cranking.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 2, or alternatively may be provided upstream of compressor 174.

Exhaust passage 148 can receive exhaust gases from other cylinders of engine 10 in addition to cylinder 30. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

As such, air flow requirements may differ when the engine is spinning fueled (to provide torque to drive the vehicle) as compared to when the engine is spinning unfueled (to assist in keeping the rotational speed of a rotating transmission component within limits). In particular, a higher air flow may be needed when the engine is spun fueled, for example, during an engine-on mode when the engine is started and a vehicle speed is raised, while a lower air flow may be provided when the engine is spun unfueled, for example, during an electric-only mode of operation when the motor drives the vehicle and the engine is spun to raise the vehicle speed above a threshold vehicle speed. To reduce air flow (and corresponding pumping losses) through the engine when the engine is spinning unfueled during the electric-only mode, a cylinder valve operation (e.g., timing, lift, duration of opening, amount of overlap, etc.) may be adjusted. In one example, where the cylinder valves are cam-actuated valves, the position of a cam phaser may be adjusted (e.g., advanced or retarded) to thereby adjust the valve operation. As elaborated herein with reference to FIGS. 4 and 9, the position of a cam phaser may be adjusted from a first position (enabling higher air flow) to a second position (enabling lower airflow) in coordination with the increase in engine speed when the engine is spinning unfueled.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing a knock or pre-ignition suppressing fluid thereto. In some embodiments, the fluid may be a fuel, wherein the injector is also referred to as a fuel injector. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 30.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different qualities, such as different compositions. These differences may include different alcohol content, different octane, different heat of vaporizations, different fuel blends, and/or combinations thereof etc. In one example, fuels with different alcohol contents could include one fuel being gasoline and the other being ethanol or methanol. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline etc.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed.

Figure 3:
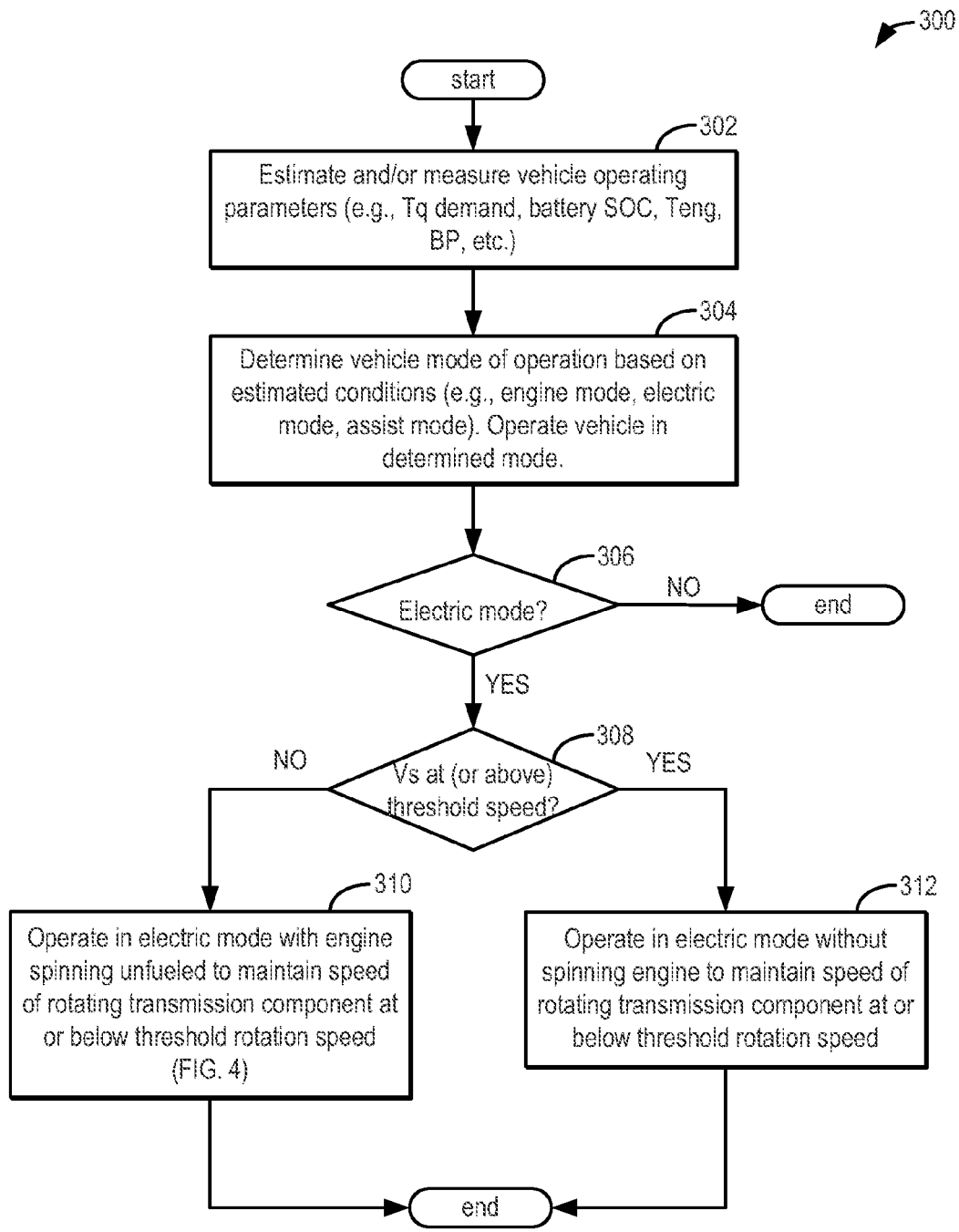
FIGS. 3-4 depict high level flow charts for spinning an engine unfueled and adjusting cylinder valve operation during an electric mode of hybrid vehicle operation responsive to attain a desired vehicle speed.

Now turning to FIG. 3, an example routine 300 is described for raising a vehicle speed during an electric-only mode of operation while maintaining the rotational speed of a rotating transmission component within limits by spinning an engine unfueled.

At 302, the routine includes estimating and/or measuring one or more vehicle operating parameters such as brake pedal position, accelerator pedal position, battery state of charge, engine temperature, ambient temperature and humidity, barometric pressure, etc. At 304, a vehicle mode of operation may be determined based on the estimated operating conditions. For example, based at least on the estimated driver torque demand and the battery state of charge, it may be determined whether the vehicle is to be operated in an engine mode (with the engine driving the vehicle wheels), an assist mode (with the battery assisting the engine in driving the vehicle), or an electric-only mode (with only the battery driving the vehicle). In one example, if the demanded torque can be provided by only the battery, the vehicle may be operated in the electric-only mode. In another example, if the demanded torque cannot be provided by the battery, the vehicle may be operated in the engine mode, or in the assist mode. The vehicle may accordingly be operated in the determined mode of operation.

At 306, it may be confirmed that the vehicle is in the electric-only mode. As such, the vehicle system may include a battery coupled to vehicle wheels via a motor, wherein the electric-only mode of operation includes propelling the vehicle using the battery via the motor. That is, without operating the engine. Additionally, electric-only operation may include decelerative events, whereby the vehicle is decelerating by virtue of its own parasitic loads (tire losses, aerodynamic losses, etc) or by using the electric motor to perform regenerative braking. If the electric-only mode is not confirmed, the routine may end.

Upon confirmation, at 308, while the electric motor is being used for propulsion, it may be determined whether the vehicle speed is at or above a threshold vehicle speed. The threshold vehicle speed may correspond to a vehicle speed above which a rotating transmission component may degrade. The threshold vehicle speed may optionally be adjusted based on the battery state of charge. In one example, the threshold vehicle speed is 62 mph when the battery is fully charged. During the electric-only mode of vehicle operation, as the motor is operated to drive the vehicle wheels and increase the vehicle speed, the rotational speed of the rotating transmission component (ratiometrically tied to wheel speed) may also increase until the component reaches mechanical constraints when the vehicle is at or above the threshold vehicle speed. Herein, to reduce the risk of mechanical degradation of the rotating transmission component, an engine control system may spin the engine unfueled for at least a duration of the electric-only mode of vehicle operation when operating the vehicle in the electric-only mode at vehicle speeds above the threshold vehicle speed. It will be appreciated that in some embodiments, the threshold vehicle speed may be further adjusted based on a temperature of the rotating transmission component. For example, as the component temperature increases, the threshold vehicle speed may be lowered to reduce thermal damage to the transmission component.

At 310, and as elaborated in FIG. 4, in response to the vehicle speed being at or above the threshold speed, the vehicle may be operated in the electric-only mode with the engine spinning unfueled to maintain a rotational speed of the rotating transmission component at or below a rotational speed limit (such as in electric_2 mode of FIG. 8). Herein, spinning the engine unfueled may include increasing the engine speed (without injecting fuel to the engine) in proportion to the raising of the vehicle speed. In comparison, at 312, in response to the vehicle speed being below the threshold speed, the vehicle may be operated in the electric-only mode without spinning the engine to maintain the rotational speed of the rotating transmission component at or below the rotational speed limit (such as in electric_1 mode of FIG. 8).

In this way, during an electric-only mode of vehicle operation, when below a threshold vehicle speed, a controller may raise vehicle speed without spinning the engine while increasing a rotational speed of a transmission component. Then, when above the threshold vehicle speed, the controller may raise vehicle speed without increasing the rotational speed of the transmission component by spinning the engine unfueled.

Figure 4:
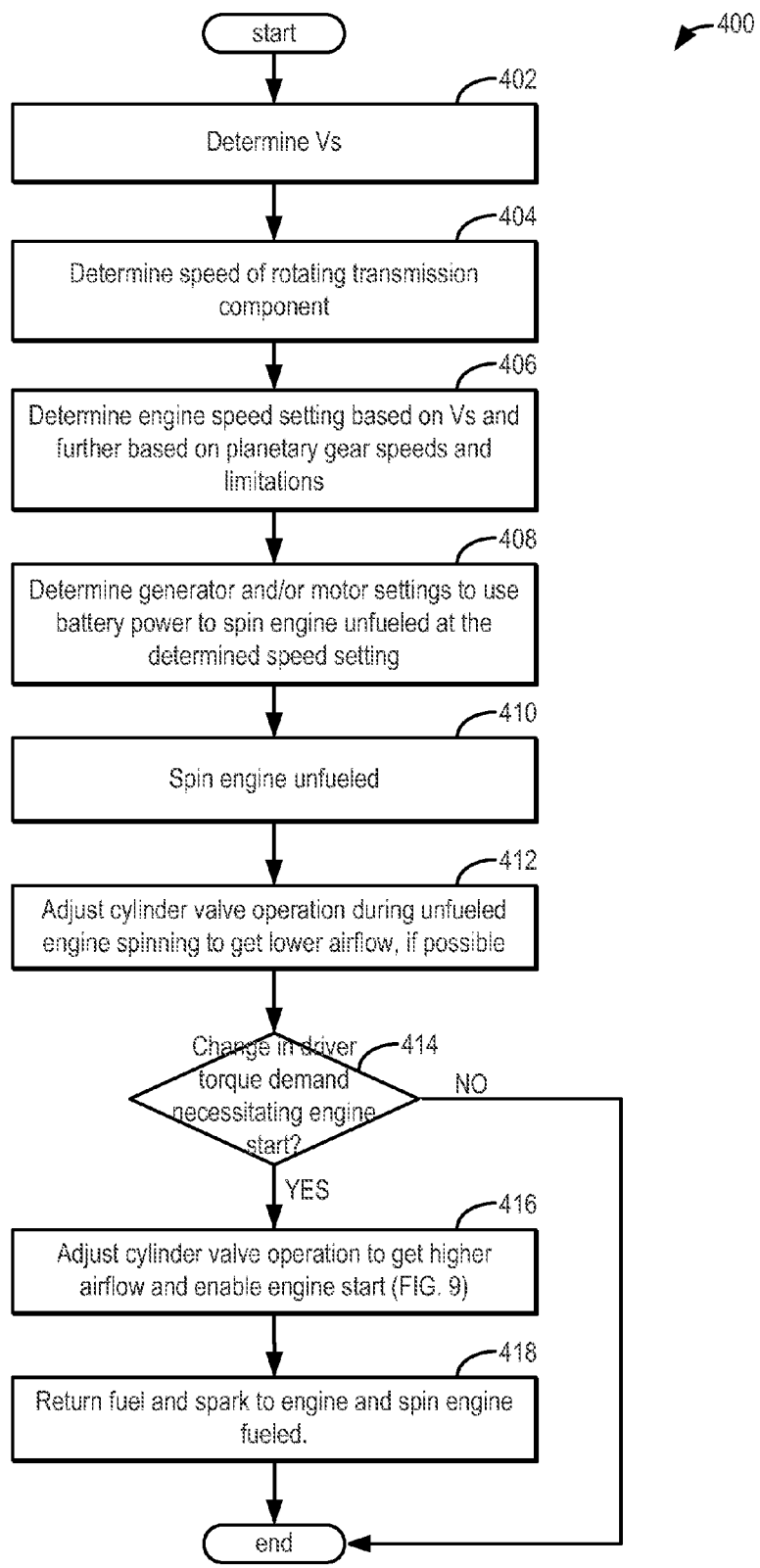

Now turning to FIG. 4, an example routine 400 is described for adjusting an engine speed at which to spin the engine unfueled during an electric mode of vehicle operation. The method further describes adjustments to a cylinder valve operation during the unfueled engine spinning to reduce parasitic engine losses.

At 402, the vehicle speed may be estimated. At 404, the rotational speed of the rotating transmission component may be determined. In one example, the rotational speed may be estimated by a speed sensor. In another example, the rotational speed may be inferred based on the rotational speed of one or more of the vehicle wheels, the motor, the generator, the one or more intermediate gear elements, the connecting shafts (input shaft, output shaft, or countershaft), and the gear ratios between the components. To reduce the rotational speed of the rotating transmission component, or to maintain the rotational speed of the component at or below a threshold rotational speed, a controller may spin the engine unfueled at an engine speed that is based on at least the vehicle speed.

Accordingly, at 406, based on the determined vehicle speed and further based on the speeds and limitations of the rotating components of the planetary gear transmission, an engine speed setting for spinning the engine unfueled may be determined. In one example, spinning the engine at an engine speed based on the vehicle speed may include spinning the engine at an engine speed based on a degree to which the vehicle speed is above the threshold vehicle speed. Thus, as the vehicle speed rises above the threshold speed, the engine speed may be increased. The engine speed may be increased in proportion to, or as an alternate function of, the difference between the estimated vehicle speed and the threshold vehicle speed.

As such, spinning the engine unfueled may include operating the generator to spin the engine at the selected engine speed, the generator operated using power from the battery. Accordingly, at 408, generator settings required to spin the engine unfueled at the selected engine setting may be determined. In some embodiments, each of the generator and the motor may be operated to spin the engine at the selected engine speed while rotating the transmission component at or below the threshold rotational speed. In those embodiments, generator and motor settings required to spin the engine unfueled at the selected engine setting may be determined. The engine speed may be set to be a calibrateable speed that is stored in the controller's memory in a look-up table accessed as a function of the vehicle speed. Alternatively, the engine speed setting may be a minimum engine speed setting required to meet the transmission component constraints, the engine speed setting continually updated based on the vehicle operating conditions. In one example, the engine speed setting selected for spinning the engine unfueled during the electric-only mode may be lower than an engine speed setting required when spinning the engine fueled during an engine-only mode to meet the same amount of driver demanded torque. Herein, by reducing the engine speed at which the engine is spun, power losses required to spin the engine may also be reduced. Additionally, resonance of a damper is avoided, in particular at 400-500 rpm.

At 410, the engine may be spun unfueled. Specifically, the generator may be operated to spin the engine at the selected engine setting while no fuel is injected into the engine cylinders. In this way, a vehicle speed may be raised above the threshold vehicle speed by spinning the engine unfueled when the vehicle is operated in the electric-only mode.

At 412, while raising the vehicle speed by increasing the speed of the unfueled engine, a cylinder valve operation may be adjusted based on the engine speed, if possible. As such, the cylinder valve adjustment may enable airflow through the engine to be reduced (e.g., minimized) when the engine is spinning unfueled so as to reduce parasitic engine losses, such as pumping losses, and to reduce air flow through the exhaust catalyst. As such, pumping losses may occur whenever cylinder intake or exhaust valves are open because air flowing into or out of the cylinder has associated flow losses due to flow restrictions, turbulence, etc. For most engines, valve opening/closing cannot be completely eliminated. However, for engines operating with variable valve timing (VVT), pumping losses can be reduced (e.g., minimized) by opening and closing the valves in a way that reduces flow restrictions. For example, by increasing valve overlap between exhaust valve opening and intake valve opening, the restriction on air flow may be reduced, thereby reducing pumping losses.

As used herein, the cylinder valve may be an intake valve and/or an exhaust valve and adjusting the cylinder valve operation may include adjusting one or more of a valve lift, a valve timing, a duration of valve opening, a valve-open dwell time, and an amount of valve overlap. As used herein, adjusting the valve timing may include adjusting a timing of valve opening and/or a timing of valve closing. In one example, where the cylinder valve is a cam-actuated valve, adjusting the cylinder valve operation may include adjusting a position of a cam phaser coupled to (a cam of) the cylinder valve. In another example, where the cylinder valve is an electrically-actuated valve, the cylinder valve operation may be substantially immediately performed. Example adjustments of cylinder valve operation are elaborated below with reference to FIG. 9.

Unfueled engine spinning may then be continued for a duration based on the driver demand and/or a battery state of charge. For example, as elaborated below and in the examples of FIGS. 5-7, the engine may continue to be spun with no fuel injected into the engine, while the vehicle is propelled by the electric motor, until the driver torque demand changes substantially or until the battery state of charge drops below a threshold state of charge (below which the battery may not be able to support the torque demand).

Thus, at 414, it may be determined if there is a change in driver torque demand that necessitates an engine (re)start. In one example, in response to a driver torque demand being higher than a threshold amount, an engine start may be required. Specifically, the higher torque demand may correlate with a desired vehicle speed that is substantially higher than the threshold vehicle speed. For example, even with valve timing adjustments, the combination of spinning the engine unfueled and operating the motor may not be fuel economical and/or mechanically feasible. During such conditions, the desired torque may be better provided by operating the engine fueled.

If no engine start is requested, the routine may end. If an engine start is requested, then at 416, cylinder valve operation adjustments may be made to increase airflow and enable the engine start. For example, a cam phaser coupled to cylinder intake and/or exhaust valves may be repositioned to increase airflow through the engine and enable an engine restart. At 418, following the cylinder valve adjustments, fuel and spark may be returned to the already spinning engine to enable engine starting for further increasing the vehicle speed via engine torque. In one example, the engine may be pre-synchronized so that is it ready for ignition and fuel injection. Upon engine start, usage of the electric motor for propulsion may be suspended (if the entire torque demand is to be provided without motor). Note however, in this powersplit configuration shown by FIG. 1, the generator must still operate to provide reaction torque to the engine, so that a net torque is output from the planetary gear-set (generator can operate in generating mode or motoring mode to provide this reaction torque). Alternatively, electric motor operation may be continued if motor torque is required to assist the engine torque in meeting the driver torque demand. That is, in response to the increased torque and/or vehicle speed demand, the vehicle may be operated in an engine-on mode immediately following the preceding engine-off (or electric-only) mode of vehicle operation. In particular, after operating above the threshold vehicle speed with the engine spinning unfueled for a duration, a controller may fuel and start the engine to maintain the vehicle speed above the vehicle speed threshold, or to further increase the vehicle speed above a second, higher speed threshold.

In this way, a method is provided for operating a hybrid vehicle system including an engine, a planetary gear transmission, and a battery-operated motor, by which method the upper limit of a vehicle speed that can be attained during an electric-only mode of operation can be raised. The method comprises, during a first condition, when the hybrid vehicle system is operated in an engine-on mode with or without operating the motor, raising vehicle speed above a threshold vehicle speed by operating the engine fueled. In comparison, during a second condition, when the hybrid vehicle system is operated in an electric mode, raising vehicle speed above the threshold vehicle speed by spinning the engine unfueled while operating the motor. Herein, during the second condition, when the vehicle speed is below the threshold speed, a rotational speed of a rotating transmission component of the planetary gear transmission may increase as the vehicle speed increases, and when the vehicle speed is above the threshold speed, the rotational speed of the rotating transmission component of the planetary gear transmission may decrease as the engine speed increases. Further, during the second condition, in response to an increase in torque demand, the already spinning engine is fueled and started to further raise the vehicle speed while disabling operation of the motor.

In one example, once the vehicle speed exceeds 62 mph, instead of running the engine fueled at 1000 rpm (e.g., at a stable combustion speed), the engine speed may be increased to 600 rpm and the engine may be spun unfueled. The fuel may remain shut off until the vehicle speed exceeds 72 mph, after which fuel and spark may be returned to the engine to further raise the vehicle speed. Herein, by spinning the engine unfueled at 600 rpm, vehicle operation may be continued without injecting fuel up to a speed of 72 mph, which covers the vehicle speed range applicable in a majority of highways in the US. As such, since the crankshaft power requirement at the lower engine speed setting (e.g., 1.1 kW of crankshaft power at 600 rpm) is lower than the crankshaft power requirement at the higher engine speed setting (e.g., 2.2 kW of crankshaft power at 1000 rpm), this approach may improve the fuel economy of a hybrid vehicle during the first 30-40 miles of a vehicle commute starting from a full charge between the speeds of 62 mph and 72 mph.

Figure 5:
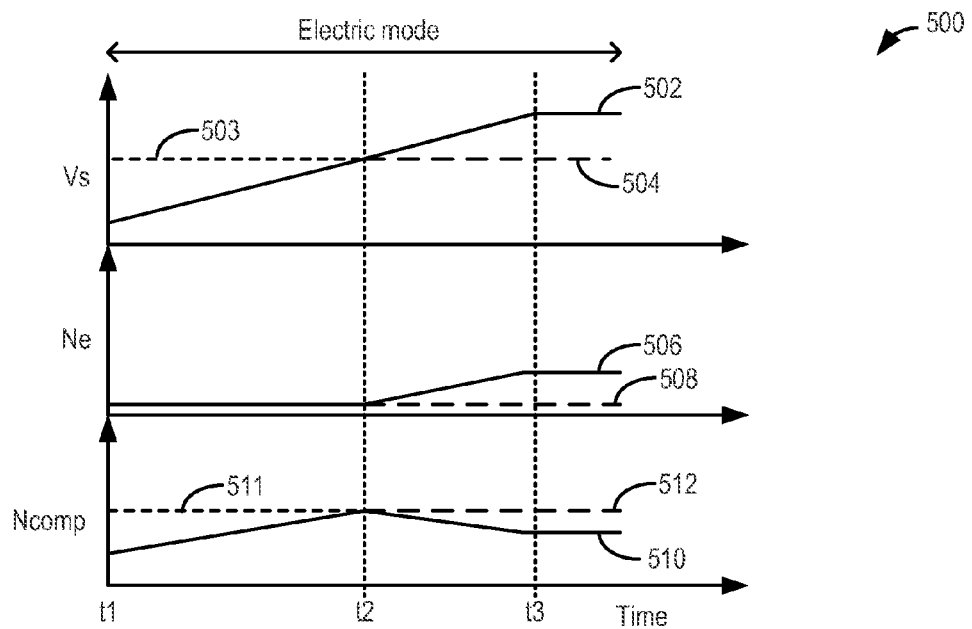
Figure 6:
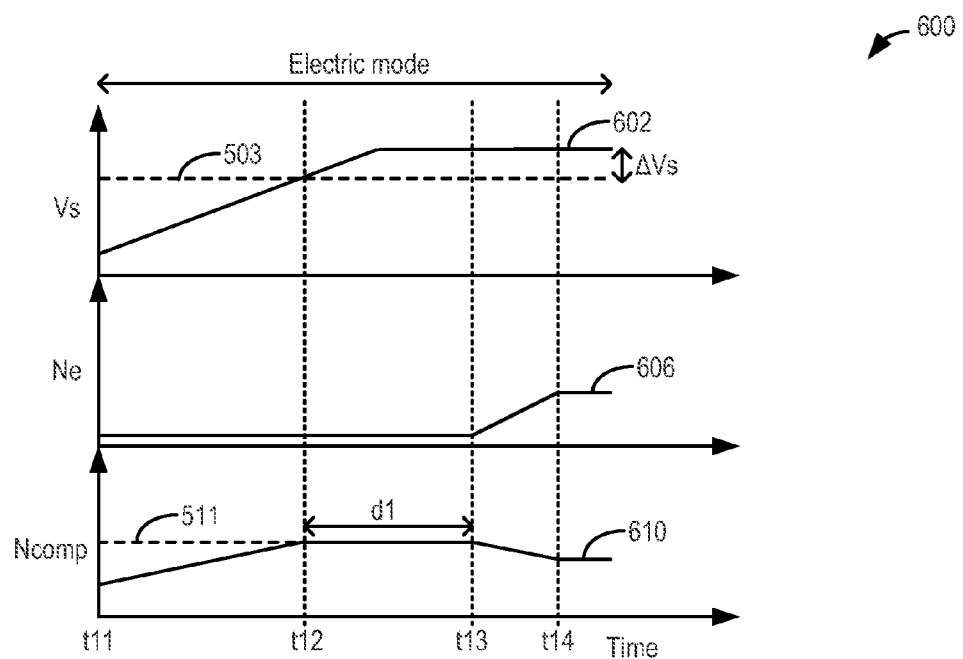

The concepts introduced in the routines of FIGS. 3-4 are now further clarified by the illustrative examples of FIGS. 5-7.

FIG. 5 shows a first example 500 wherein changes in vehicle speed (Vs) are depicted at graph 502, changes in an engine speed (Ne) are depicted at graph 506, and changes in the rotational speed of a rotating transmission component (Ncomp) are depicted at graph 510, over a duration of vehicle operation (along the x-axis). As such, over the entire duration of operation depicted in FIG. 5, the vehicle is in an electric-only mode of operation and no fuel is injected into the engine.

Between t1 and t2, in response to a driver torque demand, a vehicle speed may be gradually increased (graph 502) by providing propulsion power to the vehicle wheels from an electric motor. Due to the specific coupling of the transmission components, as the vehicle speed increases, while the vehicle speed is below threshold vehicle speed 503, the rotational speed (graph 510) of a rotating transmission component that is connected with the motor and the wheels via one or more gear elements, and is further coupled to the engine via a planetary gearset, may increase. In the depicted example, the rotational speed of the transmission component is shown increasing in direct proportion to the increase in vehicle speed while engine is not spinning. However in other examples, the rotational speed of the transmission component may increase as an alternate function of the increase in vehicle speed.

At t2, the vehicle speed may reach the threshold vehicle speed 503 which corresponds to a vehicle speed at which the rotation transmission component reaches a threshold rotational speed 511. As such, the transmission component may be degraded if the rotational speed is allowed to increase above the threshold rotational speed 511. Therefore, in the absence of any adjustments to an engine speed, the vehicle speed may not be allowed to exceed threshold vehicle speed 507. That is, if operation is continued in the electric-only mode without spinning the engine (see dashed graph 508 after t2), the rotational speed of the transmission component may be maintained at or below threshold rotational speed 511 (see dashed graph 512 after t2) by limiting the vehicle speed to the threshold vehicle speed 503 (see dashed graph 504 after t2). The inventors herein have identified that due to the specific coupling of the engine and motor to the wheels via the planetary gear transmission and the generator, vehicle speed may be raised during an engine-off mode with only the electric motor driving the vehicle and without increasing the rotational speed of the transmission component by increasing the speed of an unfueled engine.

Thus, at t2, a controller may increase the speed of the unfueled engine by spinning the engine using a generator coupled to the engine, the generator powered using energy from a system battery. As a result, between t2 and t3, the rotational speed of the rotating transmission component decreases as the rotational speed of the unfueled engine increases. After t3, the vehicle speed may be maintained at the higher vehicle speed, while the transmission component is kept below the threshold rotational speed, by maintaining the engine spinning at a selected speed setting, the selected speed setting based on the current vehicle speed.

As such, it will be appreciated that for the entire duration shown in FIG. 5, the engine may be spinning with no fuel injected into the cylinders. However, in response to a driver torque demand becoming higher than a threshold amount while the vehicle is in the electric-only (or engine-off) mode, the torque demand may be met by shifting the vehicle to an engine-on mode of operation. Specifically, the controller may return fuel and spark to the already spinning engine to further increase the vehicle speed and further increase the rotational speed of the engine. In one example, after operating the vehicle at or above the threshold vehicle speed with the engine spinning unfueled for a duration, the controller may fuel the engine to maintain the vehicle speed above the threshold vehicle speed or to further increase the vehicle speed.

FIG. 6 shows a second example 600 wherein changes in vehicle speed (Vs) are depicted at graph 602, changes in an engine speed (Ne) are depicted at graph 606, and changes in the rotational speed of the rotating transmission component (Ncomp) are depicted at graph 610, over a duration of vehicle operation (along the x-axis). As such, over the entire duration of operation depicted in FIG. 6, the vehicle is in an electric-only mode of operation and no fuel is injected into the engine.

In the example illustrated in FIG. 6, rather than limiting the highest vehicle speed that can be attained when operating the vehicle in an engine-off mode (with only the electric motor driving the vehicle), the vehicle may be allowed to operate at vehicle speeds higher than the threshold vehicle speed for a duration, after which, the engine may be spun unfueled to maintain or further raise the vehicle speed. That is, a short-term over-speeding may be allowed, but the engine may then be spun unfueled if the elevated vehicle speed is sustained. Specifically, between t11 and t12, in response to a driver torque demand, the vehicle speed may be gradually increased (graph 602) by providing propulsion power to the vehicle wheels from the electric motor, with a concomitant increase in the rotational speed (graph 610) of the rotating transmission component due to the specific coupling of the vehicle components. At the same time, the engine may not be spinning (graph 606).

At t12, the vehicle speed reaches the threshold vehicle speed 503 while the rotating transmission component reaches the threshold rotational speed 511. After t12, the vehicle speed may be raised above threshold vehicle speed 503 without increasing rotational speed of the engine for a duration d1 (between t12 and t13). Over the same duration d1, the rotational speed of the transmission component may be maintained at the threshold rotational speed 511. The duration may be based on the vehicle speed, in particular, based on a difference between the (current) vehicle speed and the threshold vehicle speed (herein depicted as ΔVs). Thus, as the vehicle speed increases above the threshold vehicle speed (that is, as ΔVs increases), the duration may be decreased. Then at t13, after the duration d1 has elapsed, vehicle speed may be maintained or further raised by increasing the speed of the unfueled engine (graph 606) in proportion to the raising of the vehicle speed. Specifically, between t13 and t14, the engine may be spun using power from a battery (via a generator). In this way, the rotational speed of the rotating transmission component may be decreased or maintained below the threshold rotational speed by increasing the speed of the unfueled engine. Thereafter (after t14), vehicle speed may be maintained (at the elevated vehicle speed) by maintaining the engine speed while also maintaining the rotational speed of the transmission component.

FIG. 7 shows a third example 700 wherein changes in vehicle speed (Vs) are depicted at graph 702, changes in an engine speed (Ne) are depicted at graph 706, and changes in the rotational speed of the rotating transmission component (Ncomp) are depicted at graph 710, over a duration of vehicle operation (along the x-axis). As such, over the entire duration of operation depicted in FIG. 7, the vehicle is in an electric-only mode of operation and no fuel is injected into the engine.

Between t21 and t22, in response to a driver torque demand, the vehicle speed may be gradually increased (graph 702) by providing propulsion power to the vehicle wheels from the electric motor, with a concomitant increase in the rotational speed (graph 710) of the rotating transmission component due to the specific coupling of the vehicle components. At the same time, the engine may not be spinning (graph 706). At t22, the vehicle speed reaches the threshold vehicle speed 503 while the rotating transmission component reaches the threshold rotational speed 511. Hereafter, vehicle speed may be raised above threshold vehicle speed 503 by spinning the engine unfueled using a battery.

As previously elaborated in FIG. 4, during the electric-only mode of operation, while spinning the engine unfueled using a battery, a controller may position a cam phaser coupled to intake and/or exhaust valves of the engine to reduce airflow through the spinning engine. Thus, after t22, the engine may be spun unfueled with the spinning of the engine coordinated with a cam phaser repositioning and cylinder valve operation adjustment. In one example, adjusting the position of the cam phaser may include advancing or retarding the cam phaser from a first position having a higher air flow through the spinning engine to a second position having lower air flow through the spinning unfueled engine. The first position may be a default position that is used to maximize air flow through the engine during engine restarts. In comparison, to reduce engine pumping losses through the unfueled spinning engine, the cam phaser may need to be repositioned to the second position with lower airflow through the engine, but reduced air flow restrictions. The second position may be based on the (current) rotational speed of the engine. In another example, the first and second positions may be adjusted so that pumping losses are reduced (by reducing flow restrictions) while also reducing air flow through an exhaust catalyst so as to maintain catalyst temperature. In the depicted example, the cam phaser may be coupled to a mechanical oil pump wherein a pump output (flow, speed, pressure, etc.) is based on the engine speed. Thus, as the engine speed increases, the pump output may be configured to correspondingly increase. Consequently, the adjusting of a position of the cam phaser may be delayed until an output of the mechanical oil pump is above a threshold pressure. In particular, between t22 and t23, the cam phaser may be maintained at the first (default) position (having a higher airflow) while the engine is spun (graph 706) until the speed of the unfueled engine is above a threshold engine speed 705 at which the output of the mechanical oil pump is above the threshold pressure. Then at t23, after the engine speed is above the threshold engine speed, the cam phaser may be shifted to the second (desired) position (having a lower airflow).

As such, between t22 and t23, while an engine speed is increased, the rotational speed of the rotating transmission component may correspondingly decrease. Then, between t23 and t24, while and after the cam phaser is repositioned, the vehicle speed may be increased while maintaining the engine speed at threshold engine speed 705 and while the rotational speed of the rotating transmission component correspondingly increases. At t24, the rotational speed of the transmission component may again reach threshold rotational speed 511. Accordingly, between t24 and t25, the engine speed may be increased, without the addition of fuel to the engine, to allow the vehicle speed to further increase while enabling the rotational speed of the transmission component to decrease below threshold rotational speed 511. Specifically, increasing the speed of the unfueled engine between t23 and t25 includes spinning the engine to increase engine speed at a first, higher rate (as determined by the slope of graph 706 between t22 and t23) up to the threshold engine speed 705, and thereafter further spinning the engine to increase engine speed at a second, lower rate (as determined by the slope of graph 706 between t24 and t25), for example, up to a higher threshold engine speed 707. Thereafter (after t25), vehicle speed may be maintained (at the elevated vehicle speed) by maintaining the engine speed while also maintaining the rotational speed of the transmission component.

In this way, when driving a hybrid vehicle in the electric-only mode with the engine spinning unfueled, by spinning the engine faster until the engine speed is at the threshold engine speed, and then spinning the engine slower after the engine speed is at the threshold engine speed, and while positioning the cam phaser after the engine speed is above the threshold engine speed, the increase in engine speed may be coordinated with cylinder valve operation adjustments to reduce engine pumping losses. By reducing the pumping losses, the electric-only mode of operation may be prolonged enabling better vehicle fuel economy while also maintaining higher exhaust catalyst temperature.

As such, in response to a driver torque demand becoming higher than a threshold amount while the vehicle is in the electric-only mode, the torque demand may be met by immediately shifting the vehicle to an engine-on mode of operation. During the engine-on mode of operation immediately following the electric-only mode of operation, a controller may reposition the cam phaser to increase airflow through the spinning engine. The position of the cam phaser may be adjusted based on a rotational speed of the unfueled engine. In one example, the cam phaser may be returned from the second position enabling a lower airflow through the spinning engine to the first, default position enabling a higher airflow through the spinning engine, and thereby better enabling an engine restart. Once the cam phaser has been repositioned to the setting that improves vehicle operation in the engine-on mode, fuel and spark may be returned to the already spinning engine to further increase the vehicle speed and the engine output.

It will be appreciated that while the example of FIG. 7 discusses an embodiment where the cam phaser is coupled to a mechanical pump, in an alternate embodiment, the cam phaser may be coupled to an electric oil pump. Herein, adjusting a position of the cam phaser may include substantially immediately adjusting the position of the cam phaser with no delays. In such an embodiment, the engine speed may be increased as soon as the vehicle speed reaches the threshold vehicle speed, and the engine speed setting may be selected based on the vehicle speed and without taking into account the cam phaser position (for example, as shown in FIG. 5).

Figure 9:
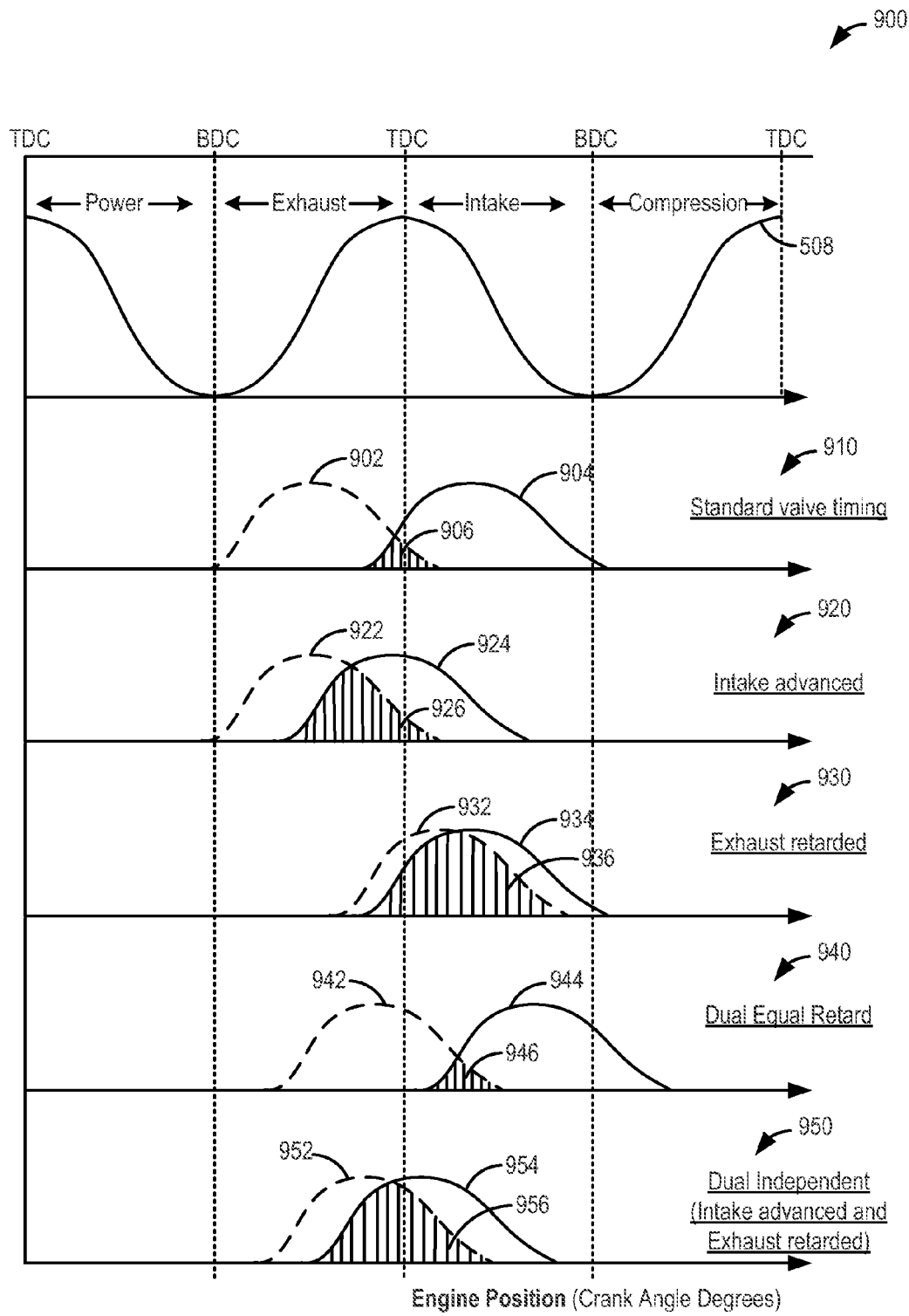
FIG. 9 depicts example adjustments to a cylinder intake and/or exhaust valve operation that may be performed while an engine is spinning unfueled.

Now turning to FIG. 9, map 900 depicts example adjustments to a cylinder valve operation that may be performed during an engine-off mode with only the electric motor driving the vehicle while a vehicle speed is raised by increasing the speed of an unfueled engine. In the depicted examples, intake and/or exhaust valve timing adjustments are shown. Each valve operation adjustment shows a valve timing and piston position, with respect to an engine position for a given engine cylinder. Specifically, the valve timings illustrated at 910-950 are compared to an engine position illustrated along the x-axis in crank angle degrees (CAD), and compared to a piston position along the y-axis with reference to their location from top dead center (TDC) and/or bottom dead center (BDC), and further with reference to their location within the four strokes (intake, compression, power and exhaust) of an engine cycle at curve 908. As indicated by sinusoidal curve 908, a piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke.

At 910, a standard valve timing is depicted. In particular, curves 902 and 904 depict valve timings for an exhaust valve (dashed curve 902) and an intake valve (solid curve 904) at a standard (unadjusted) valve timing. As illustrated, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced.

As a result of the timing differences between exhaust valve closing and intake valve opening, for a short duration, before the end of the exhaust stroke and after the commencement of the intake stroke, both intake and exhaust valves may be open. This period, during which both valves may be open, is referred to as a positive intake to exhaust valve overlap 906 (or simply, valve overlap), represented by a hatched region at the intersection of curves 902 and 904. In one example, the positive intake to exhaust valve overlap 906 may be a default position of the engine cams that is present during an engine restart (such as, an engine cold start). For example, the default position shown at 910 may correspond to the first position of a cam phaser enabling a higher airflow through the spinning engine (as discussed in the example of FIG. 7). A controller may then reposition the cam phaser from the first default position to a second, adjusted position while (or before) the engine is spinning unfueled to reduce engine pumping losses. At the second position of the cam phaser, the timing of the cylinder valves may be adjusted (e.g., advanced or retarded) relative to the first position to enable a lower airflow through the spinning engine.

As such, the cylinder valve operations may be adjusted to reduce flow restrictions, and thereby reduce pumping losses. For example, by increasing valve overlap, the airflow restriction and corresponding pumping loss may be reduced. As another example, by increasing the valve-open dwell time while increasing the overlap (e.g., using VVT capability on both the intake and the exhaust valves), pumping losses may be significantly dropped because air may move through both intake and exhaust valves anytime air enters or exits the cylinders.

In one example, the cam phaser may be repositioned to the second position shown at 920 to only adjust an intake valve timing. In particular, when the cam phaser is in the second position shown at 920, an intake valve timing (solid curve 924) is advanced relative to the timing when at the first position (shown at 910), while the exhaust valve timing (dashed curve 922) is maintained. Due to the intake valve timing adjustment, an amount of valve overlap 916 may also be increased.

In another example, the cam phaser may be repositioned to the second position shown at 930 to only adjust an exhaust valve timing. In particular, when the cam phaser is in the second position shown at 930, an exhaust valve timing (dashed curve 932) is retarded relative to the timing when at the first position (shown at 910) while the intake valve timing (solid curve 934) is maintained. Due to the exhaust valve timing adjustment, an amount of valve overlap 936 may also be increased.

In yet another example, the cam phaser may be repositioned to the second position shown at 940 to equally adjust each of an exhaust valve timing and an intake valve timing. In particular, when the cam phaser is in the second position shown at 940, each of the intake valve timing (solid curve 944) and an exhaust valve timing (dashed curve 942) are equally retarded at the second position relative to the first position. Due to the dual equal retard adjustment, an amount of valve overlap 946 may be decreased. While the depicted example shows dual equal retard, it will be appreciated that in an alternate example, each of the intake valve timing and exhaust valve timing may be equally advanced relative to their timings in the first position.

In still another example, the cam phaser may be repositioned to the second position shown at 950 to adjust each of an exhaust valve timing and an intake valve timing independently. In particular, when the cam phaser is in the second position shown at 950, the intake valve timing (solid curve 954) may be advanced while an exhaust valve timing (dashed curve 942) is retarded at the second position relative to the first position. In the depicted example, the intake valve is advanced by the same amount that the exhaust valve is retarded. However, in alternate examples, the amount of intake valve advance may be different from the amount of exhaust valve retard. In still other examples, the intake valve may be retarded while the exhaust valve is advanced, the amount of intake valve retard being the same as, or different from, the amount of exhaust valve advance. Due to the intake and exhaust valve timing adjustment, an amount of valve overlap 956 may be increased.

It will be appreciated that in the embodiment where the intake valve and the exhaust valve can be adjusted independently, still other adjustments may be possible. For example, each of the intake valve timing and the exhaust valve timing may be advanced, albeit by different amounts. Likewise, each of the intake valve timing and the exhaust valve timing may be retarded, albeit by different amounts.

It will also be appreciated that while the examples of FIG. 9 depict adjustments in cylinder valve timing to illustrate cylinder valve operation adjustments, this is not meant to be limiting. In alternate examples, one or more of a cylinder (intake and/or exhaust) valve timing, a cylinder valve lift, a duration of valve opening, a valve-open dwell time, and an amount of valve overlap may be adjusted. Likewise, to adjust the valve timing, a timing of opening the valve and/or a timing of closing the valve may be adjusted.

For example, at 950 in FIG. 9, the amount of overlap allows some of the exhaust air (non-combustion air) to exit through the intake manifold during the exhaust stroke, and some of the intake air to enter through the exhaust manifold during the intake stroke. Consequently, the total air flow into and out of the cylinder may not change, but the net air exchange from intake to exhaust manifolds may be reduced, which may help maintain a higher exhaust catalyst temperature. In another example (not shown) the overlap shown in 950 may be further spread over the intake and exhaust strokes by increasing the valve open dwell time. This would further reduce air transfer from intake to exhaust and also reduce airflow restrictions.

In this way, cylinder valve operation adjustments may be used to reduce airflow through the spinning engine and airflow restrictions when the engine is spun unfueled during an engine-off mode of vehicle operation. By reducing the airflow restrictions, parasitic losses through the engine, such as pumping losses can be reduced. In addition, oxygen loading of an exhaust catalyst can be reduced while also allowing the catalyst temperature to be maintained (e.g., above a light-off temperature). This provides additional fuel economy benefits during a subsequent engine-on mode of vehicle operation. In the event that a torque demand increases and an engine-on mode of vehicle operation is necessitated to meet the demand, cylinder valve operation may be readjusted (e.g., via cam phaser repositioning) to enable a higher airflow through the engine, thereby improving an engine restart.

It will also be appreciated that the disclosed approach may also allow a hybrid electric vehicle to operate in the electric mode with fewer engine-on disruptions until the system battery is depleted. As such, this may improve the driver's electric vehicle driving experience.

In this way, higher vehicle speeds may be achieved while a hybrid vehicle is operated in an electric mode with only an electric motor driving the vehicle wheels. In addition, the time before an engine operation is started in a hybrid electric vehicle can be increased and the engine start delayed. By increasing the rotational speed of an engine when raising a vehicle speed, without supplying fuel to the engine, a rotating transmission component may be maintained below rotational speeds at which the component may be degraded. At the same time, cylinder valve operation adjustments may be advantageously used to reduce airflow, and resultant pumping losses, through the spinning engine. By enabling higher vehicle speeds to be attained without degrading transmission components, the operator's drive experience in the electric mode can be improved. By reducing pumping losses through the spinning unfueled engine, the electric mode of vehicle operation can be prolonged to improve vehicle efficiency and fuel economy.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system.

Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. A method of operating a hybrid electric vehicle system including a rotating transmission component, comprising,
during an electric-only mode of operation:
below a threshold vehicle speed corresponding to a threshold rotational speed of the transmission component, raising vehicle speed by raising a speed of a set of driven vehicle wheels by providing a drive force from an electric motor to the set of driven vehicle wheels without spinning an engine while increasing a rotational speed of the transmission component; and
above the threshold vehicle speed, raising vehicle speed without increasing the rotational speed of the transmission component above the threshold rotational speed of the transmission component by raising the speed of the set of driven vehicle wheels by providing the drive force from the electric motor to the set of driven vehicle wheels while spinning the engine unfueled.

2. The method of claim 1, wherein spinning the engine unfueled includes increasing an engine speed in proportion to the raising of vehicle speed.

3. The method of claim 2, wherein the hybrid vehicle system includes a battery coupled to the set of driven vehicle wheels via the electric motor, and wherein the electric-only mode of operation includes propelling the vehicle using the battery via the electric motor.

4. The method of claim 3, wherein a transmission of the hybrid vehicle system includes a planetary gearset having a ring gear and a sun gear coupled via a carrier, the ring gear coupled to the set of driven vehicle wheels and the electric motor via one or more gear elements, the sun gear coupled to a generator, and the carrier coupled to the engine, wherein the rotating transmission component is one of the one or more gear elements, and wherein the electric motor and the generator are separate components.

5. The method of claim 4, wherein spinning the engine unfueled includes spinning the engine at an engine speed based on the vehicle speed.

6. The method of claim 5, wherein spinning the engine at an engine speed based on the vehicle speed includes spinning the engine at an engine speed selected based on a degree to which the vehicle speed is above the threshold vehicle speed.

7. The method of claim 6, wherein spinning the engine unfueled includes operating the generator to spin the engine at the selected engine speed, the generator operated using the battery.

8. The method of claim 7, further comprising, after operating above the threshold vehicle speed with the engine spinning unfueled for a duration, fueling the engine to maintain the vehicle speed above the threshold vehicle speed or to further increase the vehicle speed.

9. The method of claim 8, wherein the duration is based on the vehicle speed, the duration decreased as the vehicle speed increases above the threshold vehicle speed.

10. The method of claim 1, wherein the threshold vehicle speed is based on a temperature of the transmission component.

11. A method of operating a hybrid vehicle system including an engine, a planetary gear transmission, and a battery-operated motor couplable with the engine, comprising:
during a first condition, raising vehicle speed above a threshold vehicle speed by raising a speed of a set of driven vehicle wheels via fueled spinning of the engine fueled; and
during a second condition, raising vehicle speed above the threshold vehicle speed by raising the speed of the set of driven vehicle wheels by providing a drive force from the motor to the set of driven vehicle wheels while spinning the engine unfueled and operating the motor.

12. The method of claim 11, wherein during the first condition, the hybrid vehicle system is operated in an engine-on mode with or without operating the motor, and wherein during the second condition, the hybrid vehicle system is operated in an electric mode while operating the motor.

13. The method of claim 12, further comprising, during the second condition, in response to an increase in torque demand, fueling the already spinning engine to further raise the vehicle speed and disabling operation of the motor.

14. The method of claim 12, wherein the planetary gear transmission includes a rotating component, and wherein during the second condition, below the threshold vehicle speed, a rotational speed of the rotating component increases as vehicle speed increases, and above the threshold vehicle speed, the rotational speed of the rotating component decreases as an engine speed increases.

15. A vehicle system, comprising:
an engine;
a transmission including a planetary gearset, an input side of the planetary gearset coupled to the engine and an output side of the planetary gearset coupled to a set of driven vehicle wheels via one or more gear elements;
an electric motor operated by a battery; and
a controller with code for,
during an engine-off mode with only the motor driving the set of driven vehicle wheels,
raising vehicle speed without increasing engine speed for a duration by raising a speed of the set of driven vehicle wheels by providing a drive force from the motor to the set of driven vehicle wheels; and
after the duration, maintaining or further raising vehicle speed by raising the speed of the set of driven vehicle wheels by providing the drive force from the motor to the set of driven vehicle wheels while increasing the engine speed of an unfueled engine.

16. The system of claim 15, wherein the duration is based on a difference between the vehicle speed and a threshold vehicle speed.

17. The system of claim 16, wherein the controller includes further code for, during an engine-on mode immediately following the engine-off mode, returning fuel and spark to the already spinning engine to further increase the vehicle speed and further increase the engine speed, the engine-on mode in response to a driver torque demand being higher than a threshold amount.

18. The system of claim 15, further comprising a generator coupled to each of the battery and the planetary gearset, wherein the controller includes further code for increasing the engine speed of the unfueled engine by spinning the engine using the generator.

19. The system of claim 18, wherein a rotational speed of a rotating transmission component decreases as the engine speed of the unfueled engine increases.

20. A method of operating a vehicle, comprising:
   during an engine-off mode with only an electric motor driving the vehicle, raising vehicle speed by raising a speed of a set of driven vehicle wheels by providing a drive force from the electric motor to the set of driven vehicle wheels, the electric motor coupled to the set of driven vehicle wheels, while increasing rotational speed of an unfueled engine also coupled to the set of driven vehicle wheels.

* * * * *